United States Patent
Willinger et al.

[11] 3,788,277
[45] Jan. 29, 1974

[54] ANIMAL EXERCISER AND ACTIVITY DEVICE

[75] Inventors: Allan H. Willinger, New Rochelle; Albert J. Dinnerstein, Far Rockaway, both of N.Y.

[73] Assignee: Metaframe Corporation, Clifton, N.J.

[22] Filed: Jan. 14, 1972

[21] Appl. No.: 217,872

[52] U.S. Cl. .................................................. 119/29
[51] Int. Cl. ........................................... A01k 29/00
[58] Field of Search ............ 119/29, 17, 15; 272/69

[56] References Cited
UNITED STATES PATENTS

| | | | |
|---|---|---|---|
| 1,794,951 | 3/1931 | Freer | 119/29 X |
| 528,066 | 10/1894 | Ariens | 119/29 X |
| 3,682,477 | 8/1972 | Harkins | 119/29X |

Primary Examiner—Louis G. Mancene
Assistant Examiner—J. N. Eskovitz
Attorney, Agent, or Firm—Friedman & Goodman

[57] ABSTRACT

An activity device for animals of rodent variety, the device comprising a revolvable drum and a housing commonly supported so as to permit rotation of the drum relative to the housing as an animal moves along the interior of the drum.

12 Claims, 10 Drawing Figures

PATENTED JAN 29 1974  3,788,277

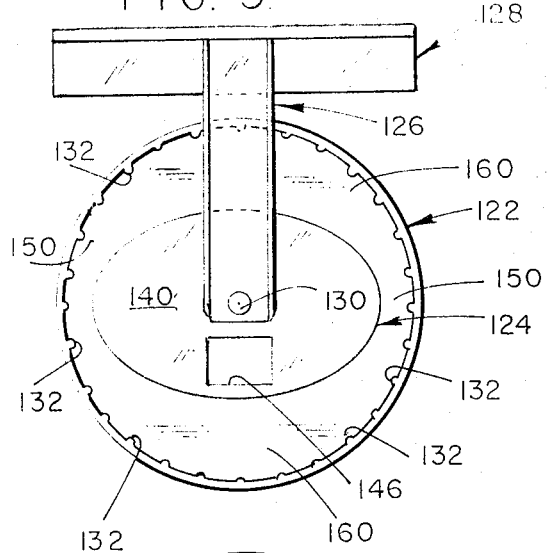
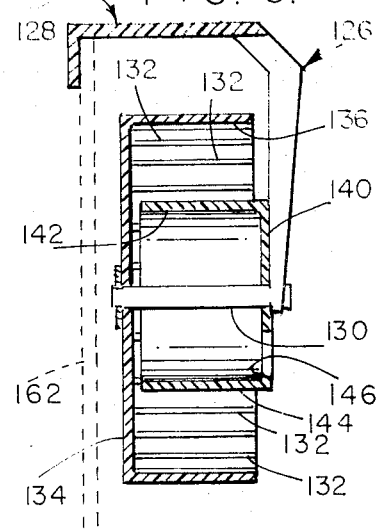
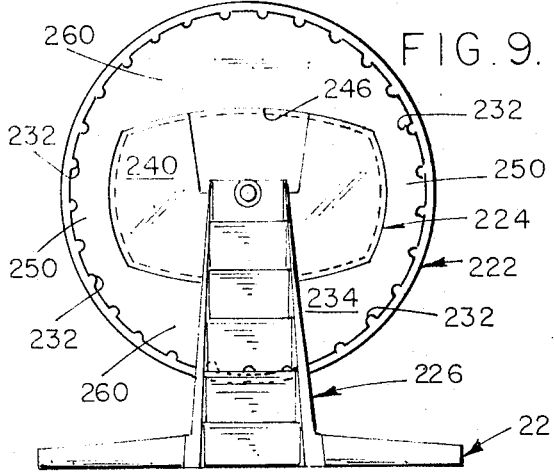
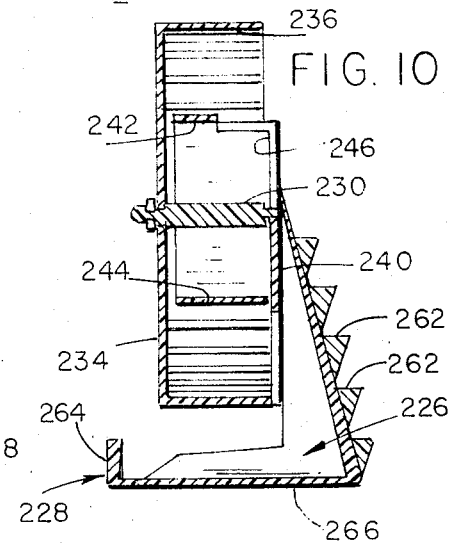
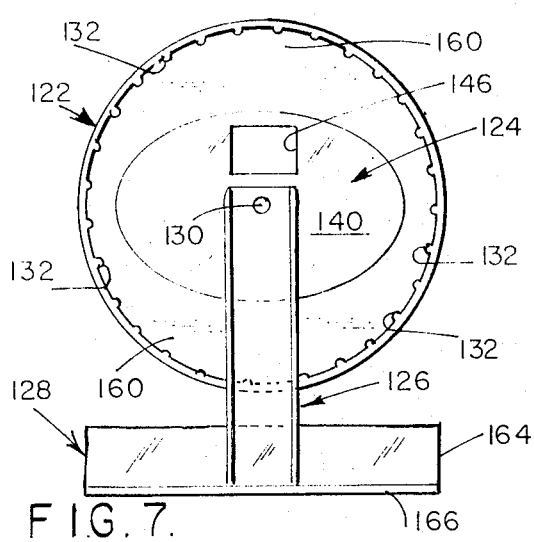
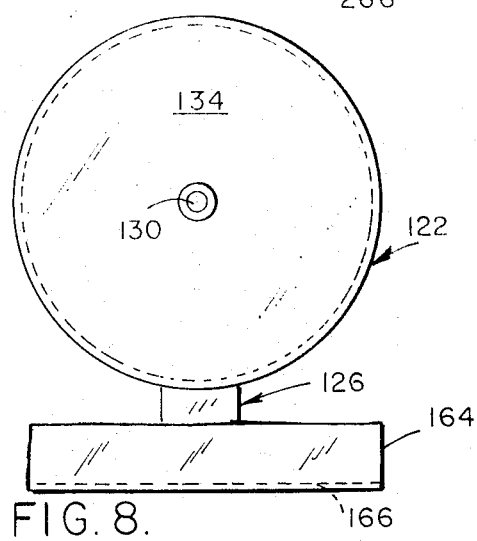

ANIMAL EXERCISER AND ACTIVITY DEVICE

BACKGROUND OF THE INVENTION

The present invention relates generally to accessories for animal cages and the like, and more particularly to a combination of a revolvable drum and a housing surrounded by the drum for recreational use by animals of rodent variety.

As is well known, there are many recreational or activity devices which employ a revolvable drum or wheel having an inner cylindrical periphery along which an animal may run for exercise.

Moreover, certain arrangements are available which utilize structure for permitting an animal to hide while in the animal cage and are utilized or disposed within the cage at a different location from that of the exercise drum or wheel. This structure, which permits an animal to hide, bears very little relation or association with that of the exercise drum, apart from the fact that each is disposed within the cage and, therefore, cannot serve adequately for encouraging an animal to explore, as animals of rodent variety are habitually so inclined, and require, because of the separate structure involved, excessive floor space, whether projected or actual, when arranged in the cage.

Furthermore, the arrangement of various hiding structure is such that the animals may climb upwardly thereon toward the uppermost portion of the cage, and as is often the case, the upper portion of the cage may be inadvertently left open by the hobbyist, or the like and, thus, it is possible for the animal to, thereby, escape.

Still another disadvantage associated with conventional recreational devices of this nature is the fact that they often can be supported in only one manner and, thus, require certain auxiliary structure within or upon the cage walls for being effectively secured thereon in an operative condition. Clearly, this limits the number of locations at which these recreational devices may be disposed within the cage and limits to some degree, the type of cage that may be utilized therewith.

SUMMARY OF THE INVENTION

Accordingly, it is an object of the present invention to provide an activity or recreational arrangement which includes a combination of a revolvable drum and a housing as a single operative unit, and which requires minimal floor space, actual or projected.

It is another object of the present invention to provide an activity device for rodents which encourages the rodent to explore, or at least attempt to explore, permits the rodent to exercise freely, and permits the rodent to hide selectively.

It is an additional object of the present invention to provide a rodent housing device which, when either suspended from a cage wall or standing freely upon the cage floor, prevents the rodent from climbing upon the extreme top portion thereof in proximity to the cage top, thereby, preventing the rodent from escaping from an inadvertently open cage top.

To this end, the present invention relates generally to an activity device for animals, said device comprising a revolvable drum having an interior along which an animal is freely movable, stationary means for permitting an animal to climb thereupon and extending substantially inwardly of said drum, and support means for permitting rotation of said drum relative to said stationary means as an animal moves along the interior of said drum.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 5 illustrates a front elevational view of a second embodiment pursuant to the present invention;

FIG. 6 illustrates a side cross-sectional elevational view of the embodiment illustrated in FIG. 5, FIG. 7 illustrates an inverted front elevational view of the embodiment illustrated in FIG. 5;

FIG. 8 illustrates an inverted rear elevational view of the embodiment illustrated in FIG. 5;

FIG. 9 illustrates a front elevational view of a third embodiment pursuant to the present invention; and FIG. 10 illustrates a side cross-sectional elevational view of the embodiment illustrated in FIG. 9.

DETAILED DESCRIPTION OF THE INVENTION

Figure 1:
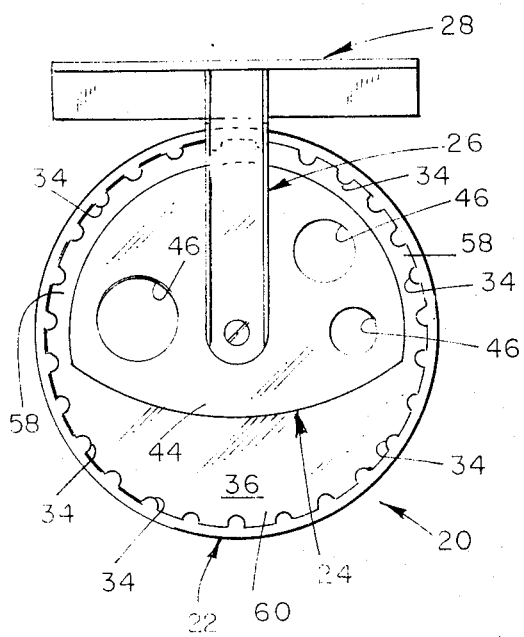
FIG. 1 illustrates a generally front elevational view of the activity device pursuant to one embodiment of the present invention, and showing the operative association of a revolvable drum in which is arranged a housing in generally concentric relation.
Figure 2:
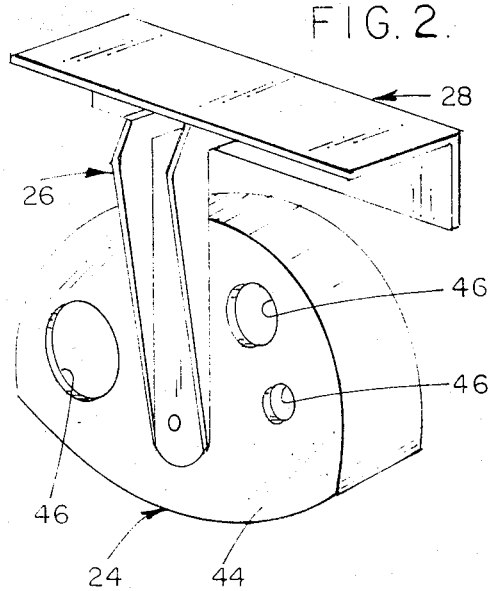
FIG. 2 illustrates a perspective view of the embodiment illustrated in FIG. 1 without the revolvable drum thereon.
Figure 3:
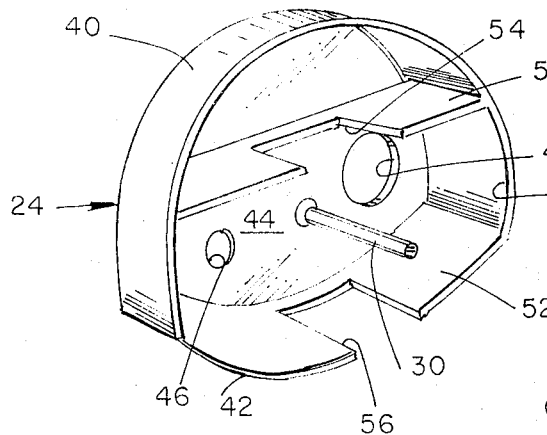
FIG. 3 illustrates a perspective view of the housing pursuant to the embodiment illustrated in FIG. 1.

Referring now to the drawings, and more particularly to FIGS. 1-4, the present invention, pursuant to one embodiment thereof, relates to an animal exercise and activity device generally denoted by the reference character 20. The device 20 includes a revolvable drum 22 internally of which is provided a housing 24, the housing being generally fixed to a bracket 26, the latter which includes, at its uppermost portion, a transverse flange 28, and at its lower portion, a shaft 30 which extends throughout the housing 24 and upon which is freely journaled for rotation relative to the housing 24 the revolvable drum 22.

The revolvable drum 22 includes a generally cylindrical wall 32 having an interior along which extends a circumferential array of spaced parallel ribs 34, the ribs longitudinally extending between a closed rear portion 36 of the revolvable drum 22 and an open front portion 38 of the drum 22.

The housing 24 includes an upper partially cylindrical wall segment 40 which is integrally interconnected to a lower arcuate segment 42. The housing 24, furthermore, includes a closed front portion 44 having entrance and exit apertures 46, and an open rear portion 48 at the opposite end of the cylindrical and arcuate wall segments 40 and 42 respectively, the open rear portion 48 of the housing 24 extending into or through the open front portion 38 of the drum 22 so as to be proximate the closed rear portion 36 of the drum 22 in slightly spaced relation with the latter, the latter acting somewhat as a back or rear wall for the housing 24.

Moreover, the housing 24 includes a medial platform 50 and a lower platform 52, the latter defined by the internal surface of the lower arcuate segment 42, notched entrance and exit apertures 54 and 56 being provided in the platforms 50 and 52 respectively.

As illustrated in FIG. 1, the upper partially cylindrical wall segment 40 of the housing 20 is generally annularly spaced from the internal cylindrical surface 32 of the revolvable drum 22, thereby, defining a generally annular clearance or passageway, the purpose of which will be clarified below. Moreover, provided below the lower arcuate segment 42 of the housing 24 and above the interior cylindrical surface 32 of the revolvable drum 22 is an enlarged animal exercise area 60, the nature of which will also be clarified below.

Figure 4:
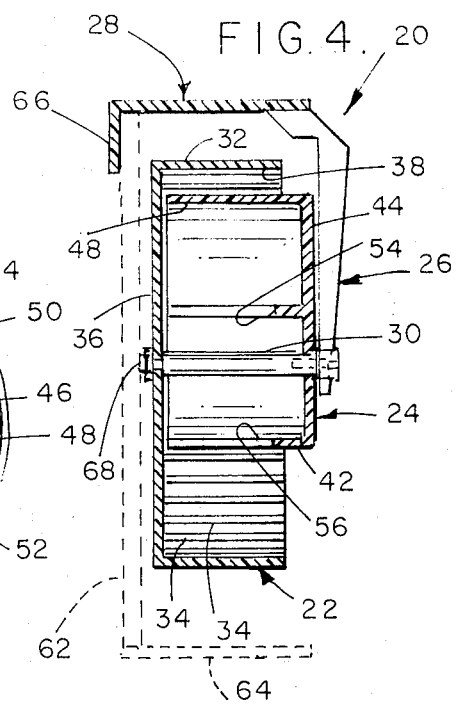
FIG. 4 illustrates a side cross-sectional elevational view of the structure illustrated in FIG. 1.

As illustrated somewhat schematically in FIG. 4, the device 20, pursuant to one embodiment thereof, may be supported upon a vertical cage wall or stand 62 having a bottom or base portion 64 such that a depending generally vertical segment 66 of the transverse flange 28 may be overhung or suspended upon the uppermost free horizontal edge of the vertical cage wall or stand 62. In this respect, the depending segment 66 of the transverse flange 28 is somewhat horizontally spaced axially of the endmost portion 68 of the shaft 30 such that the depending segment 66 contacts the vertical cage wall 62 at one surface thereof, while the endmost portion 68 of the shaft 30 contacts the opposite surface of the vertical cage wall 62 in a manner as illustrated in FIG. 4, for stability.

As generally discussed above, the closed rear portion 36 of the revolvable drum 22 is freely journaled upon the endmost portion 68 of the shaft 30 for rotation thereupon relative to the generally stationary housing 24 which is fixedly secured upon the bracket 26. The endmost portion 68 of the shaft 30 may be threaded or the like for receiving a nut or other suitable fastener which will act to stabilize and retain the closed rear portion 36 of the revolvable drum 22 upon the shaft 30.

As those skilled in the art will readily understand, an animal, such as of the rodent variety, may jump or otherwise climb onto the internal cylindrical surface 32 of the revolvable drum 22 and run therealong for exercise and the like. In this respect, the revolvable drum 22 is provided with a sufficiently large diameter and is radially spaced at the lower portion thereof from the lower arcuate segment 42 of the housing 24 so as to provide the enlarged animal exercise area 60 wherein the animal or rodent may run freely thereupon and cause rotation of the revolvable drum 22.

Moreover, as is commonly understood, rodents are of habitually tunnel-burrowing inclination and tend to explore small passageways and the like so as to satisfy their generally unsatiable curiousity. Thus, because of the provision of the housing 24 which extends internally, as opposed to externally, of the revolvable drum 22 there is provided the aforementioned partially annular clearance 58 above the cylindrical wall segment 40 of the housing 24 which constitutes a passageway readily observable to the rodent and, thereby, tends to attract or encourage the rodent to run along the interior of the revolvable drum 22 thereto for exploratory purposes, the annular clearance remaining out of reach generally of the rodent because of the revolvable nature of the drum 22.

Alternatively, the rodent may jump through or climb through the entrance and exit apertures 46 provided in the closed front portion 44 of the housing 24 so as to rest within the housing 24 or otherwise hide therein. Again, since the revolvable drum 22 surrounds generally the housing 24, should the rodent wish to climb out of the housing 24 toward the uppermost portion of the cage along which extends the transverse flange 28 in an attempt to escape from the cage, as the rodent attempts to stand upon the external surface of the revolvable drum 22, the latter which is continuously unstable because of its rotatable nature will prevent the rodent from utilizing the drum exterior for purposes of climbing upwardly and outwardly of the cage wherein the animal or rodent is confined.

Another distinctive feature of the present invention is the fact that the projected or extrapolated floor space required by the device 20 pursuant to the present invention is of minimal extent in that the housing 24 is surrounded and extends generally internally of the revolvable drum 22, thereby, providing economy in terms of overall space required by the device 20.

Referring now to FIGS. 5–8, there is illustrated still a further embodiment pursuant to the present invention. In this respect, the embodiment illustrated in FIGS. 5–8 is very much similar to that of the embodiment illustrated in FIGS. 1-4, however, a brief description of this second embodiment is, nonetheless, discussed below.

The embodiment illustrated in FIGS. 5–8 includes a cylindrical drum 122 in which extends a generally elliptical or oval housing 124, the latter which is fixedly secured to a bracket 126. The bracket 126 terminates at one end portion thereof in a transverse flange 128 and at the opposite end portion thereof in a shaft 130 which extends throughout the elliptical housing 124. The cylindrical drum 122 includes a circumferential array of spaced parallel ribs 132 which extend from a closed rear portion 134 of the drum 122 to an open front portion 136 of the drum 122.

The elliptical or oval housing 124 includes a closed front portion 140 at one end thereof and an open rear portion 142 which extends through the open front portion 136 of the drum 122, in opposing relation therewith, in close proximity with the closed rear portion 134 of the drum 122. The bottom internal surface of the housing 124 is constituted as a platform 144 which may be reached by an appropriate entrance or exit opening 146 provided in the generally closed front portion 140 of the housing 124.

As illustrated in FIGS. 5 and 7, there are provided a pair of horizontally opposite radial clearances 150 between the drum 122 and the major extent of the elliptical housing 124, and a pair of vertically opposite enlarged animal access areas 160 between the cylindrical drum 122 and the minor extent of the elliptical housing 124.

As illustrated in FIG. 6, the instant embodiment of the present invention may be mounted so as to overhang a vertical cage wall 162 so as to contact one surface of the cage wall by means of a generally vertically depending segment 164 of the transverse flange 128 and an opposite surface of the cage wall by means of an extreme end of the shaft 130 upon which is freely rotatably mounted or journaled the closed rear portion 134 of the drum 122. Thus, in a manner as described above for the embodiment illustrated in FIGS. 1-4, an animal or rodent may climb onto the lower ribbed interior of the cylindrical drum 122 and run therealong for exercise and the like, and will tend to be attracted to the radial clearances 150 because of the curious nature of the rodent. Moreover, the diameter of the cylindrical drum 122 is of sufficient extent so as to permit the rodent to run along the interior thereof within the access space 160 comfortably without having to crouch or bend its back, this because of the enlarged curvature or so-called "gentle curvature" of the cylindrical drum 122.

As illustrated in FIGS. 7 and 8, the transverse flange 128 is provided with a generally horizontally disposed flat segment 166 which is of sufficient longitudinal and lateral extent for self-supporting the drum 122 and housing 124 upon a horizontal surface such as a cage bottom or the like without any necessity for auxiliary mounting devices. In this respect, the embodiment illustrated in FIG. 5 may be inverted to permit the flat segment 16 of the transverse flange 128 to rest freely upon the cage bottom and will self-support and prevent rocking of the instant embodiment when an animal runs along the cylindrical drum 122. Thus, the housing 124 is provided with an elliptical configuration so as to provide the pair of vertically opposite enlarged animal access areas 160 and, thereby, permit an animal or rodent to run freely along the interior of the cylindrical drum 122 whether the embodiment is suspended over a cage wall in a manner illustrated in FIG. 6 or, alternatively, inverted so as to rest freely upon a horizontal support surface or the like.

It is significant to note that that because of the opposite pair of enlarged animal access areas 160, it is possible for an animal to jump or climb upon the uppermost access area 160 from within the cage. Because of this possibility, the extent of the radial clearances 150 is at least three-fourths inch, and preferably greater than 1 inch, or sufficiently chosen so as to permit the rodent to pass freely from one access area 160, above the housing 124, to the other access area 160, below the housing 124 directly between or through the radial clearances 150 without becoming wedged or otherwise injured therein.

Referring now to FIGS. 9 and 10, still a third embodiment, pursuant to the principals of the present invention is illustrated and is likewise very much similar both structurally and functionally to that of the embodiment illustrated in FIGS. 5-8. In this respect, the instant or third embodiment includes a cylindrical drum 222 in which extends a generally modified oval housing 224 which is fixed to a bracket 226 having at one end thereof a transverse flange 228 and at the other end thereof a shaft 230.

The cylindrical drum 222 includes spaced parallel re-ribs 232 along the peripheral interior thereof which extends from a closed rear portion 234 to a open front portion 236.

Similarly, the modified oval housing 224 includes a closed front portion 240 and an open rear portion 242, the bottom portion of the housing 224 including or being constituted as a platform 244 which may be reached through an appropriately provided entrance or exit opening 246 extending through the closed front portion 240 of the housing 224. The modified oval housing 224 is in fact so modified so as to provide greater space within the housing 224 than that space as provided by the housing 124 in the embodiment illustrated in FIGS. 5-8. Similarly, however, the major extent of the housing 224 defines a pair of horizontally opposite radial clearances 250 with that of the internal periphery of the cylindrical drum 222, and a pair of vertically opposite enlarged animal access areas 260 between the minor extent of the housing 224 and that of the interior of the cylindrical drum 222.

Pursuant to the instant or third embodiment of the present invention, however, there is provided upon the bracket 226 successive steps 262 respectively for permitting an animal or rodent to climb upwardly along the bracket 226 when the bracket is utilized for self-supporting both the drum 222 and the oval housing 224 upon a horizontal surface in a manner generally illustrated in FIGS. 9 and 10. Accordingly, the flange 228 is appropriately provided with a flat horizontal surface of sufficient longitudinal and lateral extent for preventing the device from rocking when an animal or rodent runs along the inner periphery of the cylindrical drum 222. The bracket 226, furthermore, includes a generally vertically extending depending segment 264 for alternatively overlying a vertical cage wall in a manner similar to that embodiment illustrated in FIG. 6.

It is of significance, that the steps 262 provided on the bracket 226 are horizontally disposed in a manner illustrated in FIG. 10 when the bracket 226 is utilized for resting freely upon the cage bottom as opposed to overhanging the cage wall. However, in the latter instance when the bracket 226 is utilized for overhanging the cage wall, the steps 262 extend from the bracket 226 in a manner which generally prevents their use and, thus, only the vertical or partially vertical segments of the steps 262 are available for the rodent's attempted grasp. Because of this vertical relationship of the portions of the steps 262, the rodent cannot utilize same for climbing upwardly toward the cage top and, thereby, cannot escape from an inadvertently open cage top.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An activity device for animals, said device comprising a revolvable drum having an interior along which an animal is freely movable, stationary means for permitting an animal to climb thereupon and extending substantially inwardly of said drum, support means for permitting rotation of said drum relative to said stationary means as an animal moves along the interior of said drum, said stationary means including a housing in which is defined a platform, said housing having an exterior radially spaced from the interior of said drum and defining a radial clearance with the latter toward which is attracted an animal of habitual tunnel-burrowing inclination, said support means including a flange-carrying bracket fixed to said housing for removably overhanging freely upon an externally associated vertical carrier source, said support means further including a shaft extending through said housing upon which is rotatably journaled said drum, said drum including an open front portion through which projects an open rear portion of said housing in opposing relation, said drum and housing each including a generally closed portion operatively associated with said shaft, said closed portion of said drum acting as a wall for said open rear portion of said housing.

2. An activity device for animals, said device comprising a revolvable drum having an interior along which an animal is freely movably, stationary means for permitting an animal to climb thereupon and extending substantially inwardly of said drum, support means for permitting rotation of said drum relative to said stationary means as an animal moves along the interior of said drum, said stationary means including a housing in which is defined a platform, said housing having an exterior radially spaced from the interior of said drum and defining a radial clearance with the latter toward which is attracted an animal of habitual tunnel-burrowing inclination, said support means including a bracket fixed to said housing for removably overhanging freely upon an externally associated vertical carrier source, said support means further including a shaft extending through said housing upon which is rotatably journaled said drum, said bracket including a flange provided with a generally flat portion of sufficient longitudinal and lateral extent, and said flat portion extending generally parallel to said shaft for self-supporting said housing and drum in an operative condition on a lower horizontal surface.

3. An activity device as claimed in claim 2 wherein said bracket includes means for permitting an animal to climb upwardly therealong into said housing when self-supporting said housing and drum on a lower horizontal surface, and means for preventing an animal from climbing upwardly therealong when overhanging an externally associated vertical carrier source.

4. An activity device as claimed in claim 3 wherein said means which permits an animal to climb upwardly along said bracket includes successive steps.

5. An activity device as claimed in claim 2 wherein said housing is provided with an exterior which is sufficiently spaced radially from the interior of said drum at least in part at two radially opposite directions for permitting an animal to move freely along the interior of said drum when said bracket self-supports said housing and drum or overhangs an externally associated vertical carrier source.

6. An activity device as claimed in claim 2 wherein said drum includes a generally cylindrical roughingly textured internal wall portion.

7. An activity device as claimed in claim 6 wherein said textured internal wall portion includes a circumferential array of spaced parallel ribs.

8. An activity device for animals, said device comprising a revolvable drum having an interior along which an animal is freely movable, stationary means extending substantially inwardly of said drum, support means for permitting rotation of said drum relative to said stationary means as an animal moves along the interior of said drum, said stationary means and said support means fixedly connected to one another, said stationary means including first and second platforms upon which an animal may climb upon and rest, said first platform being horizontally disposed within said drum in a fixed relation with respect to said support means, said first platform having an exterior spaced from the interior of said drum and defining an animal exercise area with the latter wherein an animal may run freely and cause rotation of said drum, said second platform being medially disposed and vertically spaced from said first platform, and said first platform being arcuate.

9. An activity device as claimed in claim 8 wherein said support means includes a flange-carrying bracket fixed to said stationary means for removably overhanging freely upon an externally associated vertical carrier source.

10. An activity device as claimed in claim 9 wherein said support means includes a shaft extending through said stationary means upon which is rotatably journaled said drum.

11. An activity device as claimed in claim 8 wherein a notched aperture is provided in said first platform.

12. An activity device as claimed in claim 11, wherein a notched aperture is provided in said second platform.

* * * * *